No. 615,588. Patented Dec. 6, 1898.
J. H. TAYLOR.
PLOW FENDER.
(Application filed Feb. 25, 1898.)
(No Model.)
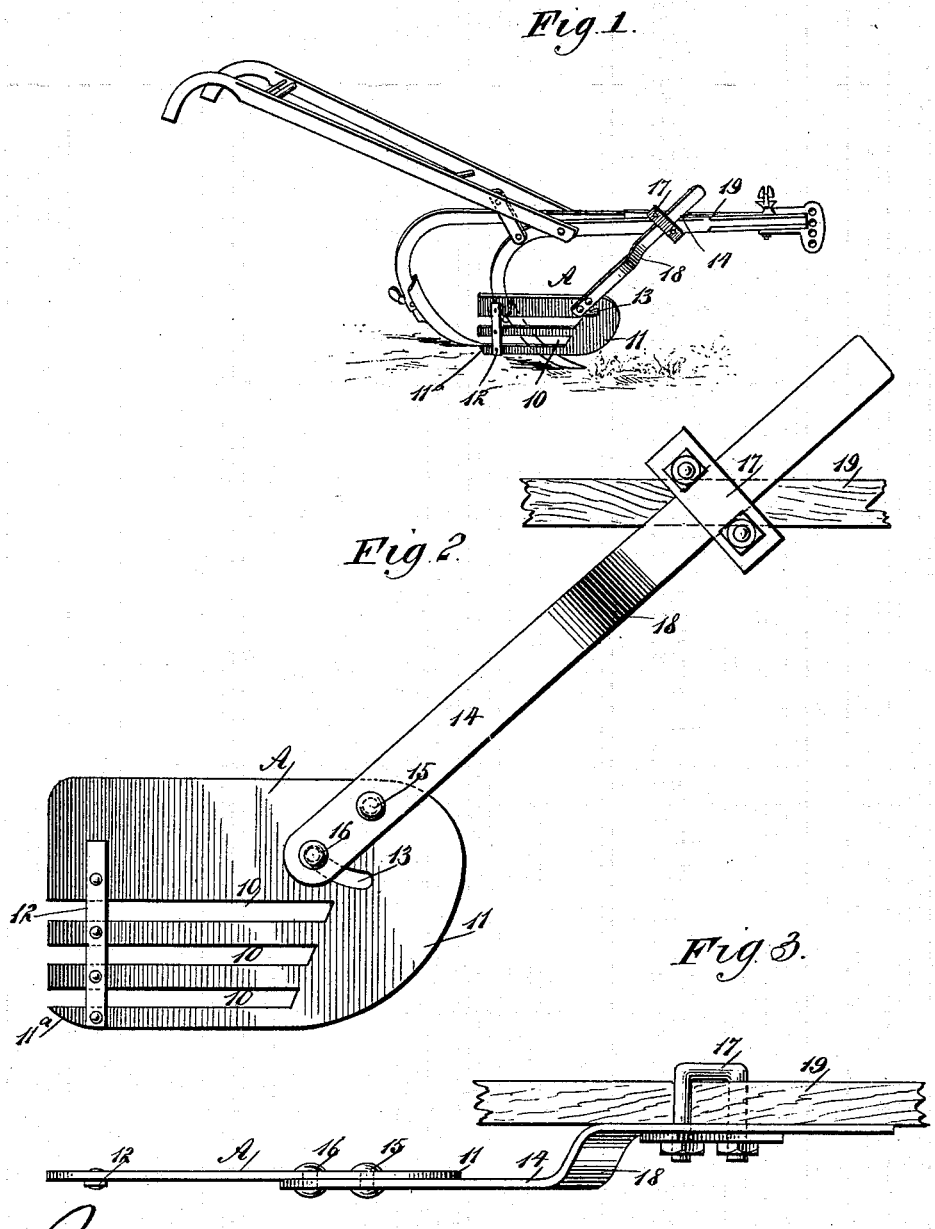

UNITED STATES PATENT OFFICE.

JOSEPH HENRY TAYLOR, OF LEWISPORT, KENTUCKY.

PLOW-FENDER.

SPECIFICATION forming part of Letters Patent No. 615,588, dated December 6, 1898.

Application filed February 25, 1898. Serial No. 671,602. (No model.)

*To all whom it may concern:*

Be it known that I, JOSEPH HENRY TAYLOR, of Lewisport, in the county of Hancock and State of Kentucky, have invented a new and Improved Plow-Fender, of which the following is a full, clear, and exact description.

The object of my invention is to provide a fender adapted for attachment to any kind of a plow, the fender being so constructed that it may be interchangeably used on a plow and will, in addition to protecting young plants, admit of fine dirt being conducted to the plants, while heavy clods and stones will be prevented from reaching said plants.

A further object of the invention is to so construct the fender that it will accommodate itself automatically to inequalities of the surface over which it may be carried.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1 is a perspective view of the plow, illustrating the application of the fender. Fig. 2 is a side elevation of the fender, drawn on an enlarged scale, showing also a portion of a plow-beam; and Fig. 3 is a plan view of the fender and a portion of the plow-beam.

The fender consists of a plate A, adapted to be held supported in a perpendicular position at one side of the plow share or shares. The plate is provided with one or with a series of longitudinal slots 10, which extend from its rear edge a suitable distance in direction of its forward edge. The forward edge 11 of the fender is preferably rounded off, as is likewise the rear edge 11$^a$ at the bottom, to permit the fender to readily pass over inequalities of the ground.

Near the upper rear portion of the plate A a curved slot 13 is made, which extends in direction of the forward edge 11 and the upper edge of the plate, as shown in Figs. 1 and 2. The fender is strengthened by means of a brace 12, which is vertically secured thereto and extends across the slots 10. More than one of the said braces 12 may be employed, if found necessary.

The fender is attached to the plow through the means of an arm 14, the said arm being attached to the fender by a pivot-pin 15, passed through the arm near its lower end and through the plate or body A of the fender at a point above the curved slot 13 therein. A second pivot-pin 16 is carried through the lower end of the arm 14 and through the slot 13, which may be termed a "guide-slot," since when the arm 14 is attached to the plow the pivot-pin 16, moving in the slot 13, will permit the body or plate A of the fender to be carried upward to clear a stone or obstruction and to gravitate downward after an obstruction has been passed.

The attaching-arm 14 is preferably secured to the beam 19 of the plow by means of a clip or a clamp 17 of any desired construction, and also preferably the attaching-arm 14 is curved outward at a point above the body A of the fender, as shown particularly at 18 in Figs. 1 and 3, in order that the attaching-arm may clear the moldboard of the plow share or shares or other projecting portions of the share or shares near which the body of the fender is to be supported. While the fender is intended mainly for double and single plows, it may be used in connection with plows or cultivator-blades of any description. By attaching the fender to the arm 14 by pivot-bolts the arm may be reversed upon the fender and the latter used with either a right or a left hand plow.

Having thus described my invention, I claim as new and desire to secure by Letters Patent—

In a plow-fender the combination of a clamp adapted to be attached to the plow-beam, an arm held rigidly by the clamp, a fender proper comprising a plate provided with an orifice and with a curved slot concentric thereto, pins held by the arm and passed respectively through the orifice and through the slot, whereby to adjustably hold the fender proper on the arm, the fender proper being provided with a series of slots running horizontally in the plate and extending to the rear edge thereof, and a brace attached to the fender proper and extending across the slotted portion to strengthen said portion.

JOSEPH HENRY TAYLOR.

Witnesses:
 JAMES W. HAYDEN,
 LUIS HERSETTON.